US009071589B1

(12) United States Patent
Patnala et al.

(10) Patent No.: US 9,071,589 B1
(45) Date of Patent: Jun. 30, 2015

(54) ENCRYPTION KEY MANAGEMENT FOR STORAGE AREA NETWORK DEVICES

(75) Inventors: Praveen Patnala, Santa Clara, CA (US); Anand Parthasarathy, Fremont, CA (US); Makarand Deshmukh, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1760 days.

(21) Appl. No.: 12/061,600

(22) Filed: Apr. 2, 2008

(51) Int. Cl.
*H04L 9/08* (2006.01)
*H04L 29/06* (2006.01)
*H04L 9/00* (2006.01)

(52) U.S. Cl.
CPC ............ *H04L 63/065* (2013.01); *H04L 9/0822* (2013.01); *H04L 9/0833* (2013.01)

(58) Field of Classification Search
CPC ..... G06F 21/10; H04L 63/065; H04L 9/0822; H04W 12/04
See application file for complete search history.

(56) References Cited

U.S. PATENT DOCUMENTS

| | | | | |
|---|---|---|---|---|
| 4,578,530 | A * | 3/1986 | Zeidler | 705/71 |
| 7,664,839 | B1 * | 2/2010 | Karr et al. | 709/223 |
| 7,773,754 | B2 * | 8/2010 | Buer et al. | 380/277 |
| 7,881,262 | B2 * | 2/2011 | Shousterman | 370/331 |
| 2004/0083390 | A1 * | 4/2004 | Cuenod et al. | 713/201 |
| 2006/0070116 | A1 * | 3/2006 | Park | 726/3 |
| 2006/0159272 | A1 * | 7/2006 | Ishiguro et al. | 380/280 |
| 2006/0204003 | A1 * | 9/2006 | Takata et al. | 380/30 |
| 2007/0028298 | A1 * | 2/2007 | Snyder et al. | 726/3 |
| 2007/0204156 | A1 * | 8/2007 | Jeghers | 713/168 |
| 2008/0005086 | A1 * | 1/2008 | Moore | 707/3 |
| 2008/0019527 | A1 * | 1/2008 | Youn et al. | 380/278 |
| 2008/0115210 | A1 * | 5/2008 | Hirota et al. | 726/20 |

OTHER PUBLICATIONS

RSA, The Security Division of EMA, "RSA Key Manager for the Datacenter: Secure Sensitive Content in Disks, File Systems, Tapes and Databases Throughout the Enterprise," Forrester Consulting, The State of Data Security in North America, Aug. 2007, 4 pages.
Sun Microsystems, Inc., "Encryption Strategies: The Key to Controlling Data," White Paper, Oct. 2007, 8 pages.

* cited by examiner

*Primary Examiner* — Dede Zecher
*Assistant Examiner* — Trang Doan

(57) ABSTRACT

An encryption key management system is provided for storage area network devices. A create key request is received at a storage area network switch. The key is created at the storage area network switch and the created key request is transmitted to a key management center. The key object is stored in the key management center and includes a unique identifier, an encrypted key, a wrapper unique identifier, and a key entity. The encrypted key can later be decrypted to generate a decrypted key. The encrypted key is decrypted using keying material accessed using the wrapper unique identifier that identifies another key object.

24 Claims, 9 Drawing Sheets

ENCRYPTION KEY MANAGEMENT FOR STORAGE AREA NETWORK DEVICES

TECHNICAL FIELD

The present disclosure relates to management of encryption keys in storage area network (SAN) devices.

DESCRIPTION OF RELATED ART

Various storage area network (SAN) devices including storage media encryption (SME) devices allow encryption of data stored on disks and tapes. In many instances, each disk logical unit number (LUN) or tape cartridge uses a unique key object for data encryption and/or authentication.

However, mechanisms for managing and securing keys for cryptographically processing data stored on disks and tape cartridges are limited. Consequently, it is desirable to provide improved methods and apparatus for managing encryption keys for encrypting and/or authenticating data in storage area network devices.

BRIEF DESCRIPTION OF THE DRAWINGS

The disclosure may best be understood by reference to the following description taken in conjunction with the accompanying drawings, which illustrate particular example embodiments.

DESCRIPTION OF EXAMPLE EMBODIMENTS

Figure 1:
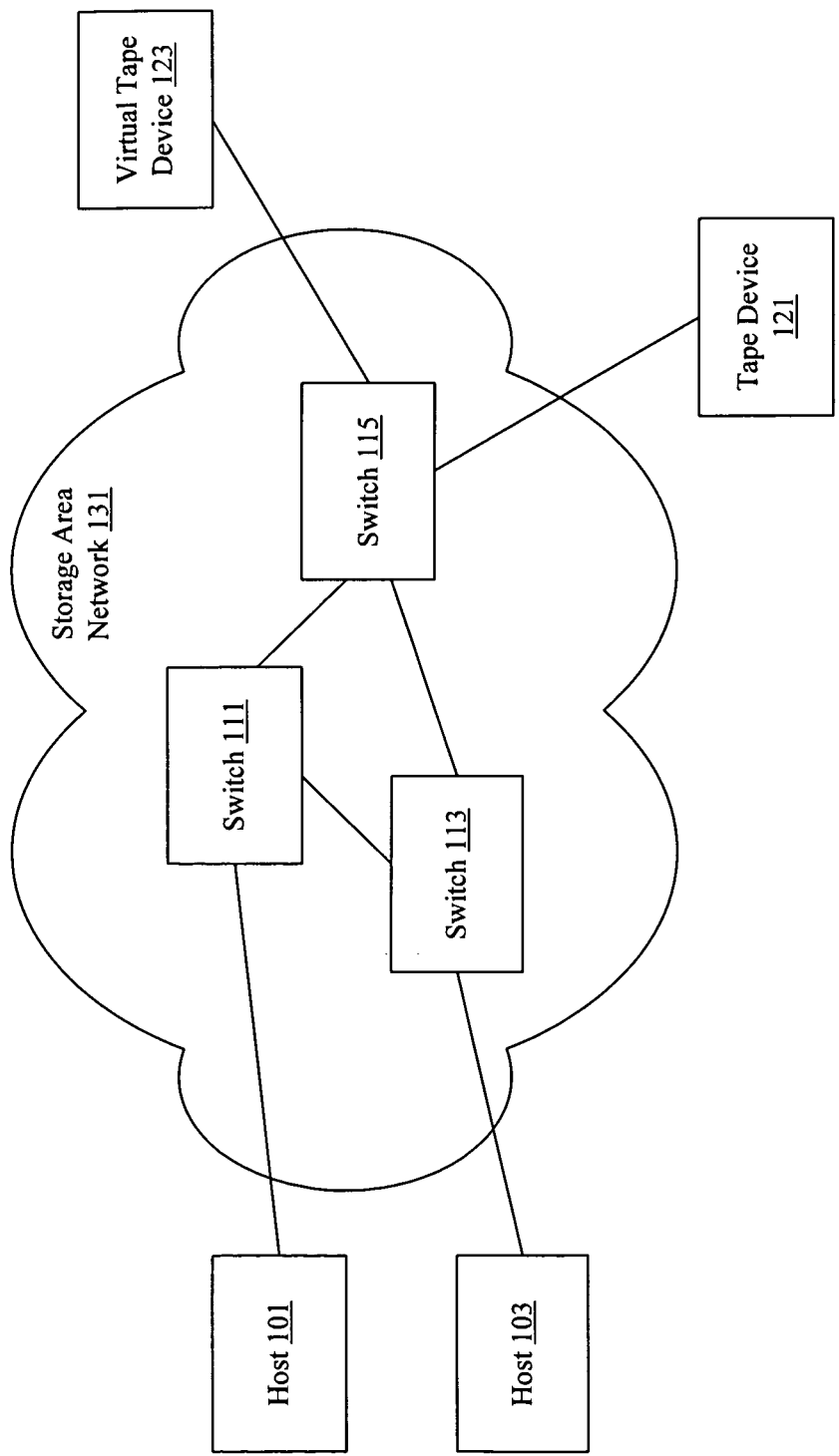
FIG. 1 illustrates a particular example of a storage area network (SAN).

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular keys and storage area networks (SANs). However, it should be noted that the techniques of the present invention apply to a variety of encryption mechanisms, keys, and SANs. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

An encryption key management system is provided for storage area network devices. A create key request is received at a storage area network switch. The key is created at the storage area network switch and the created key request is transmitted to a key management center. The key object is stored in the key management center and includes a unique identifier, an encrypted key, a wrapper unique identifier, and a key entity. The encrypted key can later be decrypted to generate a decrypted key. The encrypted key is decrypted using keying material accessed using the wrapper unique identifier that identifies another key object.

Example Embodiments

Various systems allow encryption of data stored on disks and tapes. In some conventional systems, hosts connected to storage devices such as disk arrays and tape drives cryptographically process data prior to writing the data to storage devices. A host application manages the encryption and authentication processes. However, to perform cryptographic processes efficiently, each host requires a cryptographic accelerator. It is often impractical to provide numerous hosts with individual cryptographic accelerators. In some other conventional systems, storage devices themselves manage cryptographic processes. The storage devices such as tape drives would encrypt the data prior to writing data to tape. The tape drives would also decrypt data read from tape cartridges. However, to perform cryptographic processes efficiently, each storage device would also require a cryptographic accelerator.

Consequently, the techniques and mechanisms of the present invention provide a network based mechanism for performing cryptographic processing. Neither hosts nor storage devices need to perform any cryptographic processing. When data is transmitted from a host to a storage device, a storage area network (SAN) switch cryptographically processes the data and maintains key information. According to particular embodiments, data written to individual tape cartridges and disk LUNs have unique keys maintained by the SAN switch. The keys are managed efficiently using a key database by including a unique identifier (UID) such as a globally unique identifier (GUID) in a key object. Various random number generation schemes can be used to minimize the incidence of key collision. Having a UID in a key object allows efficient retrieval of keys for cryptographic processing of data stored on disk LUNs and tape cartridges. The UIDs themselves may also be written to disk LUNs and tape cartridges.

According to particular embodiments, the keys themselves are encrypted by intermediate and/or master keys that may be unique to a particular data center. When a particular key and/or associated data is moved to another datacenter, the key is reencrypted using intermediate and master keys associated with the new data center.

In addition to a UID and a key itself, key objects in a key database may also include a key entity, or a description of the storage medium that a key object belongs to, key state information, and a wrapper UID or wrapper GUID identifying the key object used to encrypted the key in the present UID. A key database may include millions of key objects corresponding to the millions of disk LUNs and tape cartridges written at a datacenter. Efficient use of key objects allows efficient searching, management, and migration capabilities. In particular embodiments, keys themselves are maintained in a hierarchy, with keys encrypted using intermediate keys and intermediate keys themselves encrypted with other intermediate keys or a master key.

According to particular embodiments, a master key is not maintained in a key database or key management center and is kept only in a secure line card. A backup copy of the master key can be derived using a threshold secret sharing mechanism, where a master key is split into n shares total such that any m out of n shares are required to recreate the master key. One mechanism for splitting the master key uses Shamir's Polynomial Secret Sharing Algorithm. Each individual share of the master key is maintained with different individuals and each share may optionally be encrypted using symmetric or asymmetric keys. Master key shares can be stored in external smartcards.

During a disaster recovery scenario where the participating switches and the crypto nodes are not available to provide master keys, a threshold number of recovery officers with the master key shares can reassemble the original master key.

FIG. 1 illustrates a particular example of a network that can use particular example embodiments. Hosts 101 and 103 are connected to storage area network (SAN) 131. Hosts may be storage servers are other entities configured to access storage devices such as tape devices and disk arrays. Virtual tape device 123 and tape device 121 are connected to switch 115. Other storage devices such as optical drives and redundant arrays of independent disks (RAIDs) may also be connected.

SAN 131 includes switches 111, 113, and 115. According to particular embodiments, the switches 111, 113, and 115 include multiple line cards and cryptographic accelerators for performing encryption, authentication, and key management. In particular embodiments, one of the switches is configured as a key management center including a key database for maintaining keys for cryptographically processing data. A key management center may be implemented as part of a switch or as a stand alone device.

Figure 2:
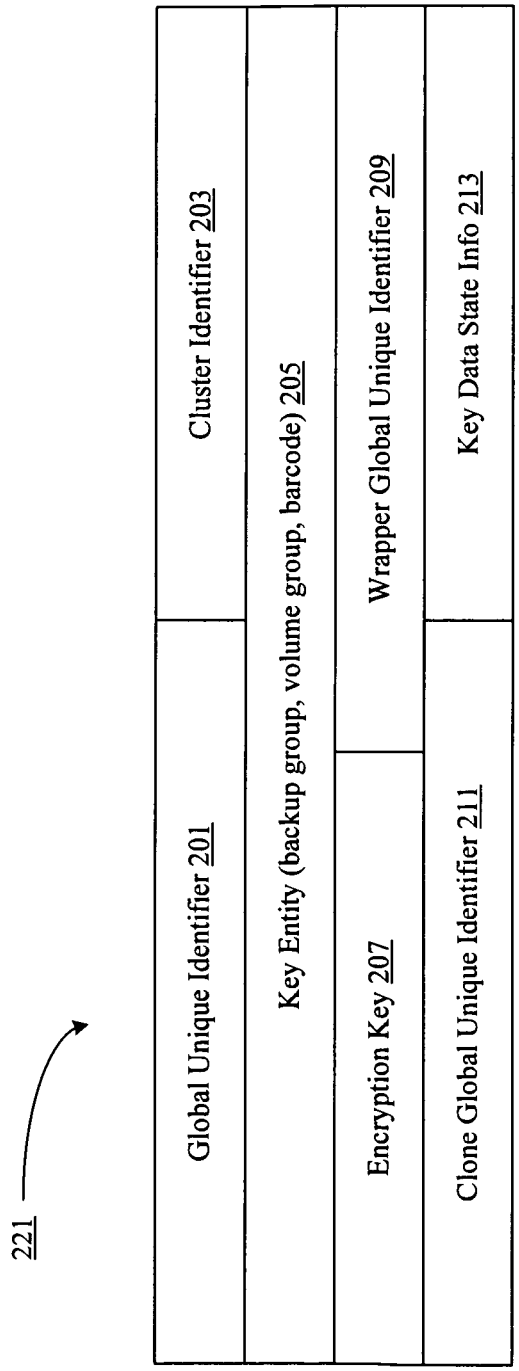
FIG. 2 illustrates a particular example of key management center entry.

FIG. 2 is a diagrammatic representation showing one particular example of a key object. Key object 221 includes a globally unique identifier (GUID) 201. According to particular embodiments, the GUID is a randomly generated number that is unique within a particular SAN and likely unique amongst numerous SANs. The GUID may be used to index key objects in a key database. The key object 221 also includes a cluster identifier 203. The cluster identifier 203 specifies a particular group of switches the key object belongs to. A key entity field 206 specifies a backup group, a volume group, and a barcode associated with a particular storage medium such as a disk LUN or a tape cartridge. In particular examples, the key entity field 206 is used to identify a particular disk or tape. An encryption key 207 holds the actual keying material used to encrypt and/or decrypt data. Both symmetric and asymmetric keys may be used.

According to particular embodiments, a key object 221 also includes a wrapper globally unique identifier 209. A wrapper globally unique identifier (WGUID) 209 is provided to identify a key object used to secure the encryption key 207. In particular examples, the WGUID 209 specifies a separate key object in the key database. According to particular embodiments, a key object 221 also includes a clone globally unique identifier (CGUID). In particular examples, the key object 221 in one cluster is copied from the key object database of a different cluster. The CGUID 221 points to the original key object from which key object 221 was copied. If multiple copies occur, the CGUID 211 still points to the original key object. Key data state information 213 identifies whether an encryption key 207 is maintained in the database in the clear or in encrypted form. If the key is encrypted, the state information 213 specifies the type of encryption such as RSA encryption, symmetric encryption with another key object, password wrapping, etc.

Figure 3:
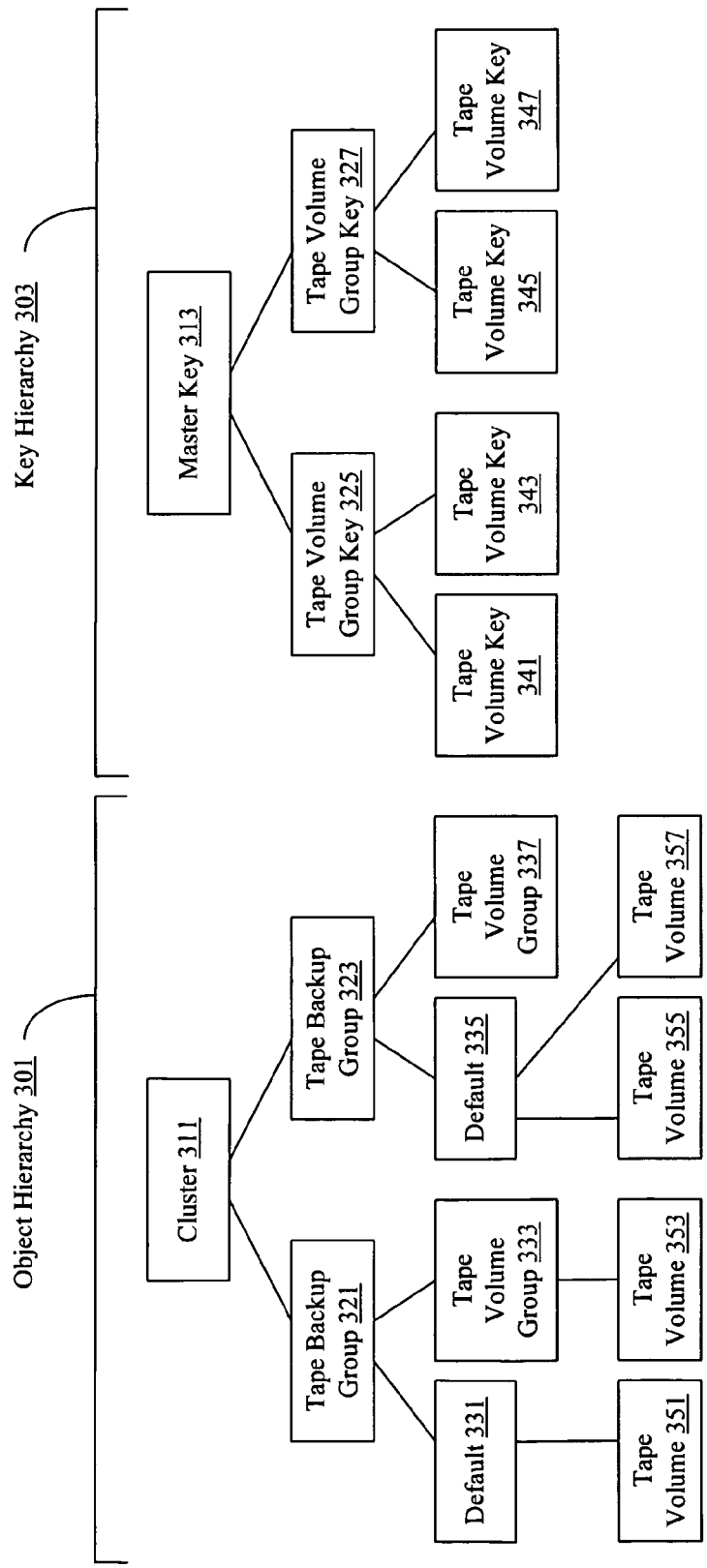
FIG. 3 illustrates a particular example of a key and object hierarchy.

FIG. 3 illustrates one example of an object hierarchy 301 and a key hierarchy 303. According to particular embodiments, SAN administrators and users may want to specify different keys for different groups of storage media. For example, a particular tape volume group may be assigned a particular key. A particular tape backup group may also be assigned a particular key. A user having a key for a specific back group would be able to access, decrypt, and authenticate data stored on a specific set of tape cartridges but not be able to access other data.

According to particular embodiments, a cluster 311 is associated with a master key 313. In particular examples, access to the master key 313 provides access to all data encrypted in the cluster 311. A cluster may include numerous switches and storage devices. Tape backup group 321 and 323 may correspond to tape volume group keys 325 and 327. Users having tape volume group keys 325 and 327 have access to tape backup groups 321 and 323. Tape volume groups 333, 337, and default tape volume groups 331 and 335 correspond to tape volume keys 343, 347, 341, and 345. Default tape volume group key 331 is used to cryptographically process tape volume 351. Default tape volume group key 335 is used to cryptographically process tape volumes 355 and 357. Tape volume group key 333 is used to cryptographically process tape volume 353.

According to particular embodiments, a key management center maintains a number of keys including intermediate keys associated with a SAN. A key associated with a particular cartridge may be encrypted using an intermediate key. The intermediate key may be encrypted using another intermediate key which itself may be encrypted with a master key. In particular examples, a key management center does not maintain a master key or top level key in encrypted or plaintext form. The master key is created when a cluster is created and a first cryptographic node such as a cryptographic node within a switch is added. According to particular embodiments, the master key as well as an associated private RSA key is maintained within a Federal Information Processing Standards (FIPS) module associated with a switch line card. In particular examples, the master key is maintained inside the bootflash of a line card in a SAN switch.

When a later cryptographic node is added to a cluster, the system can acquire the master key encrypted using RSA public key private key encryption from another cryptographic node. The master key remains encrypted whenever it is transmitted outside of a FIPS module.

Figure 4:
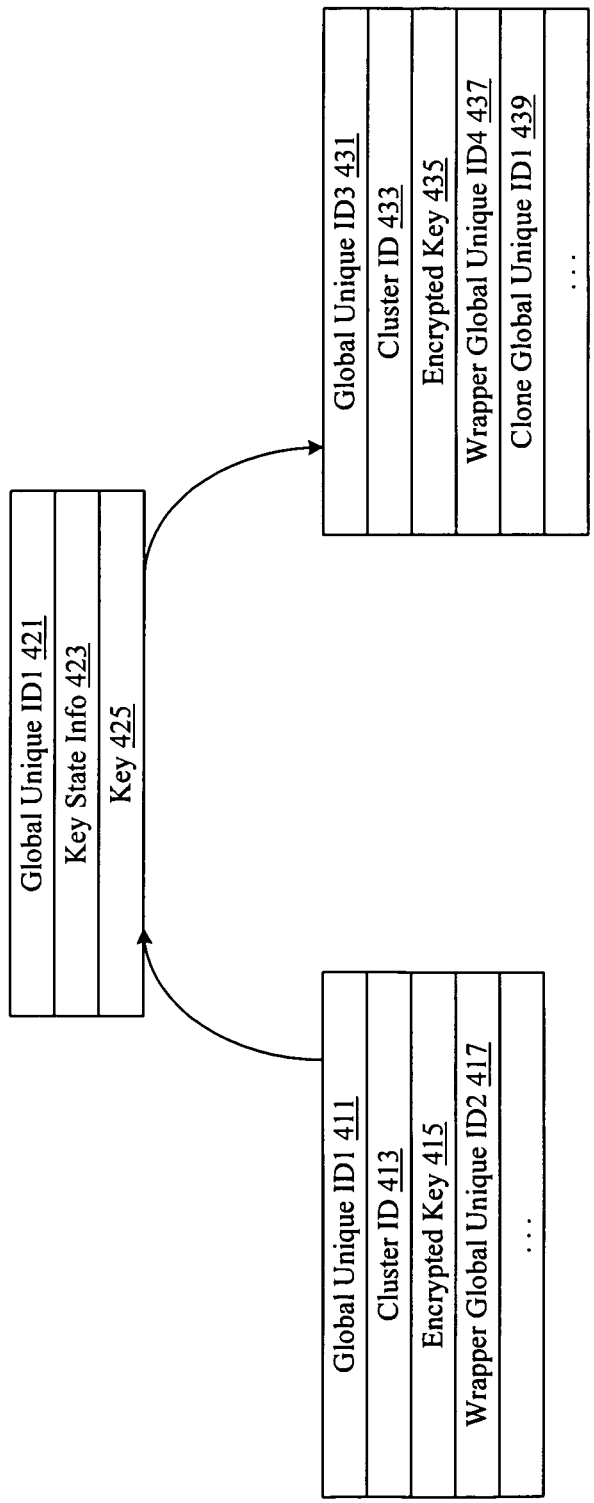
FIG. 4 illustrates a particular example key management center entry modification during migration.

FIG. 4 illustrates one example of key object migration. According to particular embodiments, a tape cartridge and its associated key may be moved from one cluster to another. To facilitate sharing of the keys, each key object has a clone GUID attribute. The clone GUID index identifies the original key object from which the current key object was copied. When a cloned key is further cloned, the clone GUID field is modified to point to the original key object. According to particular embodiments, a system user can trigger an operation to export a set of keys from a source cluster to a destination cluster. The keys are then decrypted or unwrapped in the current cluster using cluster specific master and intermediate keys and are then encrypted or rewrapped for export purposes. For example, a key object having GUID1 411, cluster identifier 413, encrypted key 415, wrapper GUID2 417 as well as other fields is decrypted and unwrapped using intermediate and master keys specific to the source cluster.

According to particular embodiments, the GUID1 421 is provided in a message along with key state information 423 and a key 425. The key 425 may be plaintext or encrypted using a variety of mechanisms. When the message reaches a destination cluster, a key object is created by reencrypting and rewrapping the key using intermediate and master keys associated with the destination cluster. The key object at the destination cluster includes GUID3 431, cluster identifier 433, encrypted key 435, wrapper GUID4 437 and clone GUID1 439 as well as other fields.

In particular examples, the key 425 is RSA protected with a public key, private key pair. For transmission, a key is encrypted with the private key of the source cluster and the public key of the destination cluster. With this mechanism, the key is verified as a key from the source cluster and the key can only be imported to the destination cluster. In other examples, the key 425 is symmetrically encrypted with a user specifying a password at the source cluster.

In particular examples, a unique random salt is allocated and fed with a password to generate a suitable encryption and authentication key. The keys are then used to encrypt key 425 using symmetric encryption methods. With this mechanism, keys can be imported to any cluster (or clusters) as chosen by the user. At any time, a system user can trigger an operation to import a set of keys from another cluster. The keys are first decrypted or unwrapped at a source cluster using the source cluster intermediate and master keys. The keys can then be packaged using a particular transport mechanism and reencrypted encrypted or rewrapped at the destination cluster using the intermediate keys and/or the master key of the destination cluster.

The newly created keys have a new GUID3 431. The GUID1 411 of the original key is then recorded in the newly created key by using the Clone GUID 439 attribute. If the original key is a cloned key by itself, then the Clone GUID 439 index is copied as is. Keys are decrypted based on the mechanism of export. RSA protected keys are decrypted with the local RSA private key. A sanity check is done to verify that the encrypted keys are really meant for this cluster (by comparing the RSA public key of the local cluster and that in the imported file). If the decryption fails, then the keys are not imported.

According to particular embodiments, a user exports the keys corresponding to the tape storage media from the original cluster and the keys are imported onto the remote cluster. After a tape cartridge is inserted into a tape device for decryption, the GUID from the cartridge is extracted and a message is sent to the local key management center for key retrieval. In particular examples, the key management center processes key retrieval requests based on the provided GUID. The local key database is accessed based on the GUID. If no object is found, then the Clone GUID attribute is searched to obtain a matching key object. The later retrieval method is executed when key retrieval requests are received while decrypting storage media imported from a remote cluster. This provides simple, secure and flexible mechanisms for exporting and importing keys in a variety of systems. Keys can be translated from one cluster to another, and further translated to multiple clusters in a chained fashion. Additionally, keys can be exported from one cluster and imported into multiple data centers. Users can populate multiple data centers with key objects. The Clone GUID attributes allows system administrators to locate an original key object in an original cluster.

Figure 5:
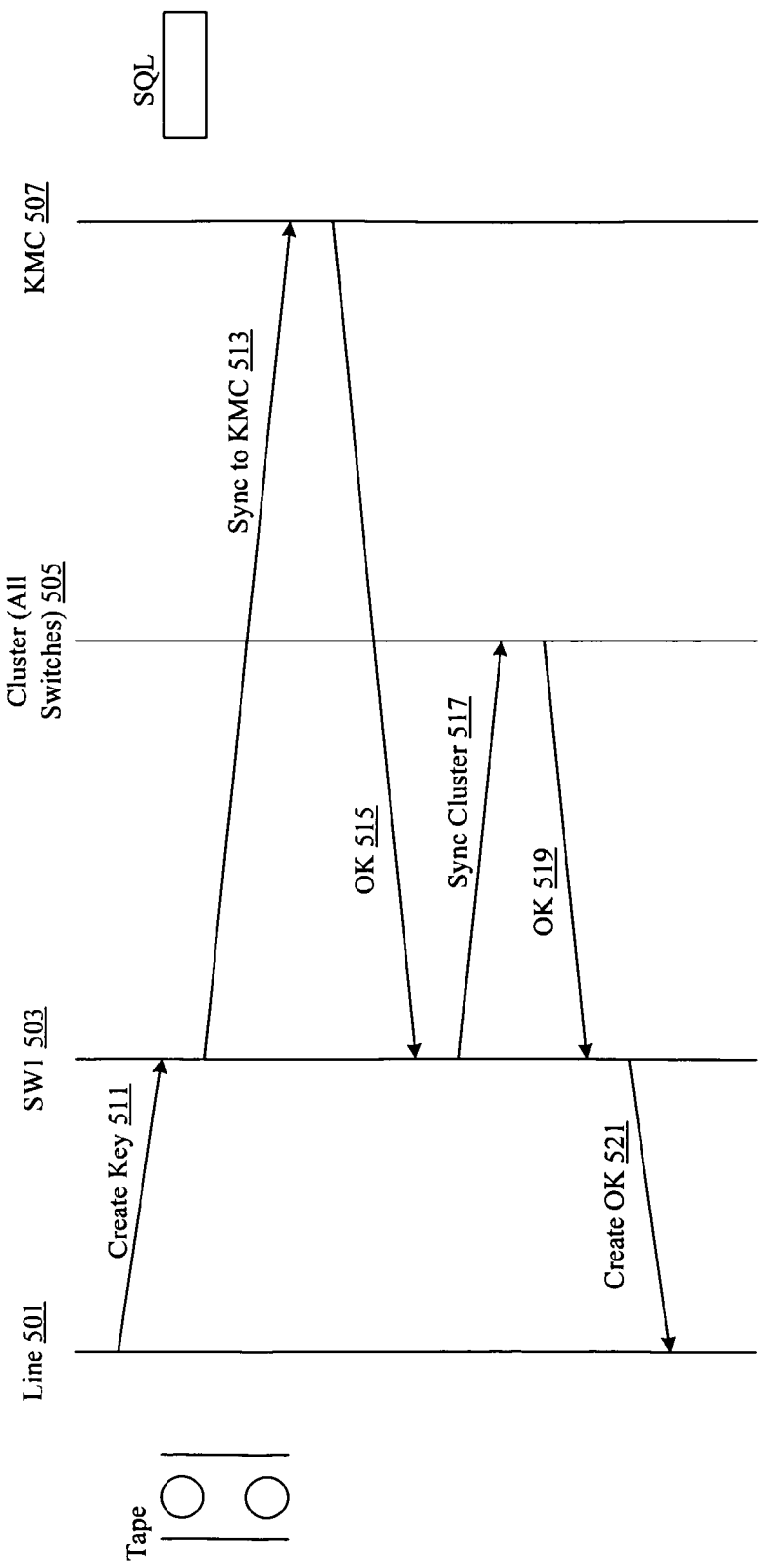
FIG. 5 illustrates a particular example of an exchange diagram for the creation of an encryption key.

FIG. 5 illustrates one example of key management. A key management center maintains a number of key objects. A line 501 provides a create key request 511 to a switch 503. The switch 503 sends a key sync message 513 to a key management center 507. According to particular embodiments, the key management center 507 or key database only maintains key objects for data object keys and intermediate keys. The key management center 507 does not maintain any master keys. The key management center 507 sends an acknowledgement 515 to switch 503. According to particular embodiments, the key is then provided to all switches in a cluster 505 by transmitting sync cluster messages 517.

According to particular embodiments, each switch in the cluster 505 maintains master keys, intermediate keys, as well as data object keys in a secure environment such as FIPs modules. The cluster 505 sends an acknowledgement 519 to the switch 503. Switch 503 acknowledges the key creation request with a create acknowledge message 521.

Figure 6A:
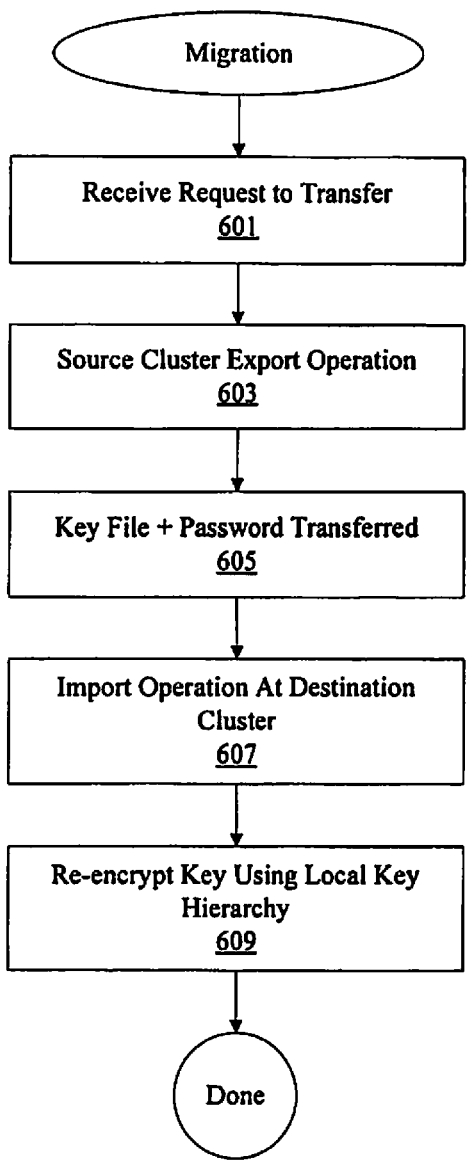
FIG. 6A illustrates a particular example of object key management.

FIG. 6A illustrates one particular example of managing key objects. Any key used to access data in an object such as a tape cartridge of disk LUN is referred to herein as an object key. Any key used to encrypt the object key is referred to herein as an intermediate key. Any key used to encrypt intermediate and/or object keys is referred to herein as a master key. At 601, a create key request is received at a SAN switch. At 603, the create key request is forwarded to a key management center. At 605, a response received from the key management center is synchronized with other SAN switches in a cluster. At 607, an access request for data associated with a particular user identifier is received. The access may be a read or write access. At 609, the key object in the key management center is accessed using the UID. In some examples, the keys may already be available within a FIPS boundary of a line card on the SAN switch. In other examples, the key object may have to be obtained. If the object is not available by checking UIDs, a list of clone UIDs can also be checked to see if the UID matches a parent of any of the key objects at the key management center. At 611, the key in the key object is decrypted using the wrapper UID to obtain the intermediate key. At 613, data is cryptographically processed using the decrypted key.

Figure 6B:
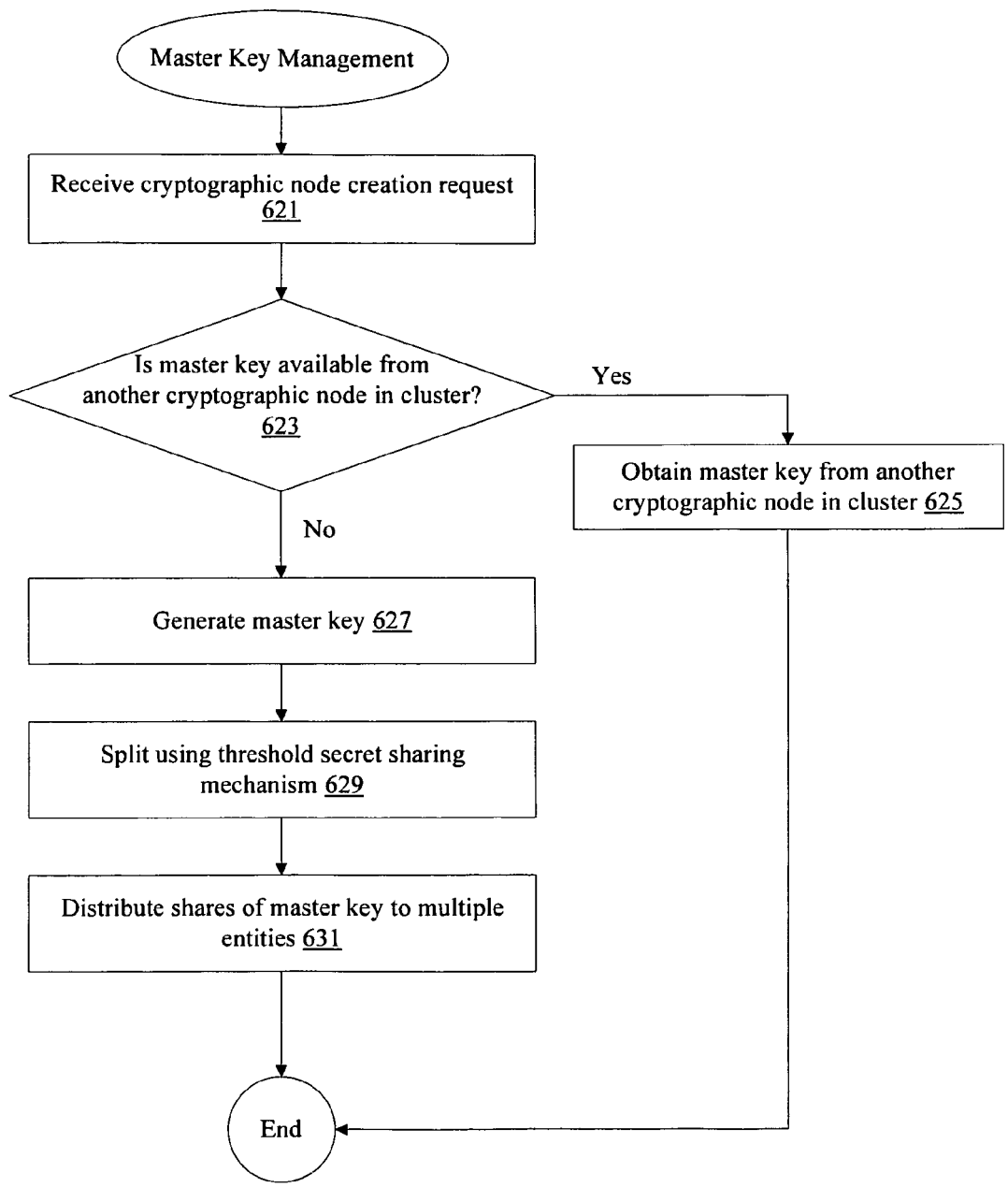
FIG. 6B illustrates a particular example of master key management.

FIG. 6B illustrates one particular example of master key management. At 621, a cryptographic node creation request is received. At 623, it is determined if the master key is available from another cryptographic node in the cluster. If a master key is available from another cryptographic node at 623, the master key is obtained from another cryptographic node at 625. According to particular embodiments, the master key may be transferred using RSA public and private key pairs. If the master key is not available on another cryptographic node at 623, a master key is generated at 629.

According to particular embodiments, the master key is split into a number of shares using a threshold secret sharing mechanism 627 and can be later recovered using a subset of the number of shares. For example, the master key may be split into five shares using the threshold secret sharing mechanism. Only two or three shares may be necessary to reconstitute the master key. At 629, shares of the master key are distributed to multiple entities at 629.

Figure 6C:
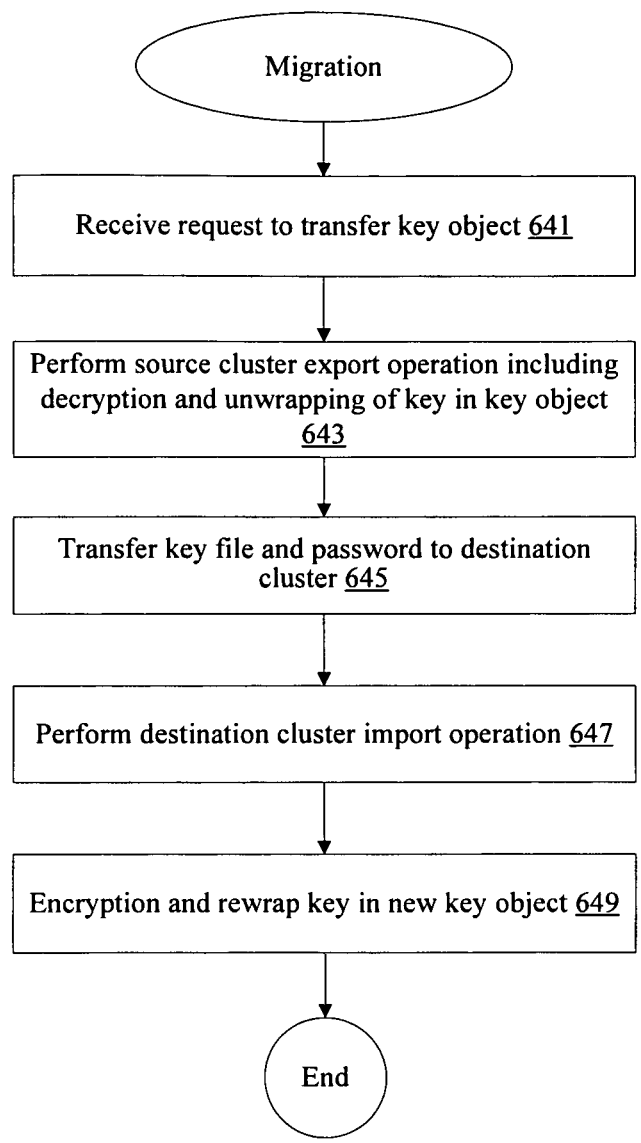
FIG. 6C illustrates a particular example of key migration.

FIG. 6C illustrates one particular example of key migration. At 641, a request is received to transfer an encryption key. According to particular embodiments, the request may be received after a tape cartridge has been moved from a source cluster to a destination cluster. At 643, the source cluster performs an export operation for a particular key object associated with a GUID. The export operation decrypts the key associated with the GUID using master and/or intermediate keys. The key and associated data is then encrypted for transfer. The key may be encrypted using the public key of the destination cluster if available as well as the private key of the source cluster if available. The key may also be encrypted using a symmetric key.

According to particular embodiments, the destination cluster performs an import operation at 647. In particular examples, the destination cluster obtains the key from the source cluster and reencrypts the key using its own intermediate key and master key hierarchy at 649.

A variety of devices and applications can implement techniques and mechanisms of particular embodiments. For example, a variety of switches, line cards, and databases can perform aspects of key management and migration. In particular examples, a fibre channel switch in a storage area network with access to a key database or key management center is operable to perform aspects of particular embodiments. In particular examples, the switch includes a cryptographic acceleration card for performing encryption, decryption, and authentication operations. Multiple line cards are provided to allow connection to a number of other fibre channel switches in the storage area network. According to particular embodiments, each line card includes a FIPS that maintains the master key and one or more intermediate and object keys. When a key is not available in a FIPS, a key database or key management center may be access to obtain the key. The switch may also include forwarding engines, physical layer and media access control components, and arbiters.

Figure 7:
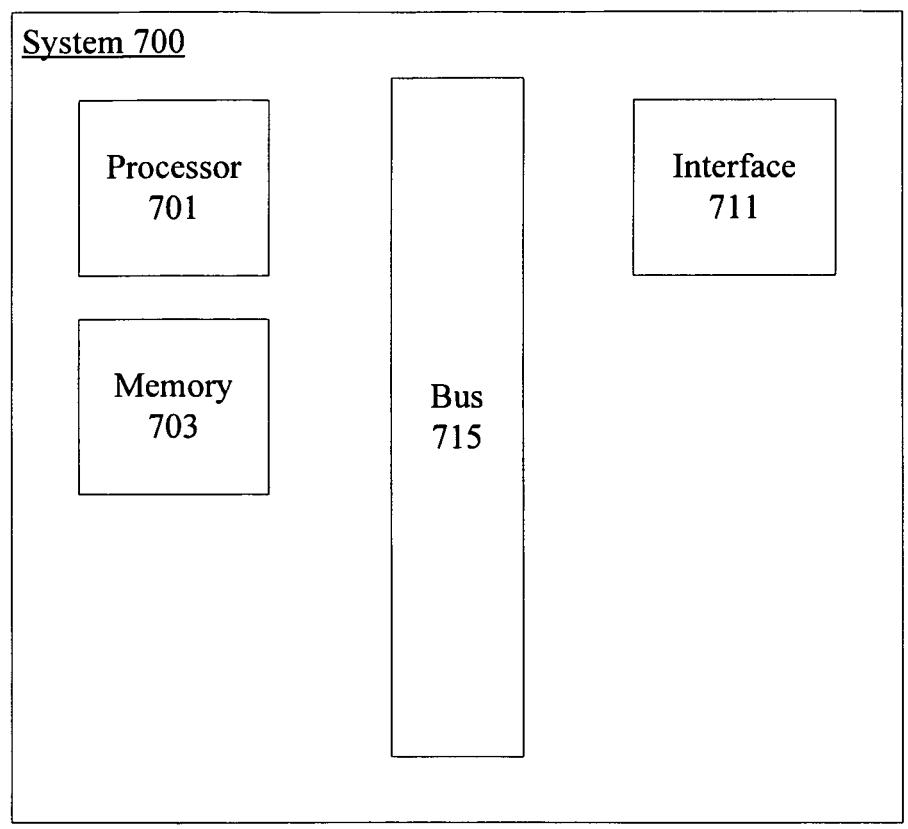
FIG. 7 illustrates a particular example of a network device.

FIG. 7 illustrates one example of a device that can implement particular embodiments. According to particular example embodiments, a system 700 suitable for implementing particular embodiments of the present invention includes a processor 701, a memory 703, an interface 711, and a bus 715 (e.g., a PCI bus). When acting under the control of appropriate software or firmware, the processor 701 is responsible for such tasks such as processing and forwarding streams. In some embodiments, specialized components such as cryptographic accelerators are used for cryptographic processing. A variety of specially configured devices can also be used in place of a processor 701 or in addition to processor 701. The interface 711 is typically configured to send and/or receive data packets or data segments over a network. According to particular embodiments, the interface is a storage area network interface, although other interfaces are also possible. Particular examples of interfaces include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 700 uses memory 703 to store data and program instructions. The program instructions may control the operation of an operating system and/or one or more applications, for example. The memory or memories may also be configured to store received packets, bindings, Keep-Alive states, periodicity information for monitored session packets, Flow-Through and/or Flow-Around configurations, etc.

Because such information and program instructions may be employed to implement the systems/methods described herein, the present invention relates to tangible, machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
   receiving a create key request at a storage area network switch;
   transmitting, from the storage area network switch, the create key request to a key management center, wherein a key object is created at the key management center, the key object including a unique identifier, an encrypted key, and a wrapper unique identifier, and wherein the key object also includes a cluster identifier specifying a particular group of network devices to which the key object belongs;
   receiving the encrypted key at the storage area network switch from the key management center; and
   decrypting, at the storage area network switch, the encrypted key to generate a decrypted key, wherein the encrypted key is decrypted using keying material accessed using the wrapper unique identifier, the wrapper unique identifier referencing another key object at the key management center.

2. The method of claim 1, wherein the unique identifier is a globally unique identifier.

3. The method of claim 2, wherein the globally unique identifier is written to a storage area network medium.

4. The method of claim 3, wherein the storage area network medium is tape.

5. The method of claim 3, wherein the storage area network medium is a disk logical unit number.

6. The method of claim 1, wherein a key entity identifies the storage area network medium.

7. The method of claim 1, wherein the wrapper unique identifier is a wrapper globally unique identifier that points to another key object having information for decrypting the encrypted key.

8. The method of claim 7, wherein another key object further includes an additional wrapper unique identifier.

9. The method of claim 1, wherein the key object further comprises key state information.

10. The method of claim 1, further comprising transmitting the key object to a plurality of storage area network switches.

11. The method of claim 1, wherein the key management center serves a plurality of storage area network switches.

12. The method of claim 1, wherein the unique identifier is unique at least within a particular Storage Area Network (SAN).

13. The method of claim 1, wherein the wrapper unique identifier identifies the another key object from which the key object was copied.

14. The method of claim 1, wherein the keying material is accessed, at least in part, using the another key object.

15. A system, comprising:
an interface operable to receive a create key request at a storage area network switch and transmit the create key request to a key management center, wherein a key object is created at the key management center, the key object including a unique identifier, an encrypted key, and a wrapper unique identifier, wherein the interface is also operable to receive at least the encrypted key from the key management center, and wherein the key object also includes a cluster identifier specifying a particular group of network devices to which the key object belongs; and
a processor operable to decrypt the encrypted key to generate a decrypted key, wherein the encrypted key is decrypted using keying material accessed using the wrapper unique identifier, the wrapper unique identifier referencing another key object at the key management center.

16. The system of claim 15, wherein the unique identifier is a globally unique identifier.

17. The system of claim 16, wherein the globally unique identifier is written to a storage area network medium.

18. The system of claim 17, wherein the storage area network medium is tape.

19. The system of claim 17, wherein the storage area network medium is a disk logical unit number.

20. The system of claim 15, wherein a key entity identifies the storage area network medium.

21. The system of claim 15, wherein the wrapper unique identifier is a wrapper globally unique identifier that points to another key object having information for decrypting the encrypted key.

22. The system of claim 21, wherein another key object further includes an additional wrapper unique identifier.

23. An apparatus, comprising:
means for receiving a create key request at a storage area network switch;
means for transmitting the create key request to a key management center, wherein a key object is created at the key management center, the key object including a unique identifier, an encrypted key, and a wrapper unique identifier, and wherein the key object also includes a cluster identifier specifying a particular group of network devices to which the key object belongs;
means for receiving the encrypted key from the key management center; and
means for decrypting the encrypted key to generate a decrypted key, wherein the encrypted key is decrypted using keying material accessed using the wrapper unique identifier, the wrapper unique identifier referencing another key object at the key management center, wherein the keying material is accessed via the another key object referenced by the wrapper unique identifier.

24. A non-transitory computer readable medium having computer code embodied therein, the non-transitory computer readable medium, comprising:
computer code for receiving a create key request at a storage area network switch;
computer code for transmitting the create key request to a key management center, wherein a key object is created at the key management center, the key object including a unique identifier, an encrypted key, and a wrapper unique identifier, and wherein the key object also includes a cluster identifier specifying a particular group of network devices to which the key object belongs;
computer code for receiving the encrypted key from the key management center; and
computer code for decrypting the encrypted key to generate a decrypted key, wherein the encrypted key is decrypted using keying material accessed using the wrapper unique identifier, the wrapper unique identifier referencing another key object at the key management center, wherein the keying material is accessed via the another key object referenced by the wrapper unique identifier.

* * * * *